United States Patent [19]

Roelofs et al.

[11] Patent Number: 4,823,127

[45] Date of Patent: Apr. 18, 1989

[54] AUTOMATIC, REAL-TIME FAULT MONITOR VERIFYING NETWORK IN A MICROWAVE LANDING SYSTEM

[75] Inventors: Darrell D. Roelofs, Huntington Station; Alfred R. Lopez, Commack; Kenneth R. Doris, Setauket, all of N.Y.

[73] Assignee: Hazeltine Corporation, Greenlawn, N.Y.

[21] Appl. No.: 40,505

[22] Filed: Apr. 20, 1987

[51] Int. Cl.$^4$ .............................................. G08B 29/00
[52] U.S. Cl. .................................... 340/947; 342/35; 342/408; 364/429; 377/29
[58] Field of Search ............... 340/945, 947, 963, 507, 340/514, 825.16, 825.17; 244/1 R; 364/428, 429, 449, 183; 342/33, 34, 35, 372, 420, 411, 408; 377/28, 52, 107, 29; 371/3, 14; 73/178 R, 178 T

[56] References Cited

U.S. PATENT DOCUMENTS

| | | | |
|---|---|---|---|
| 3,389,392 | 6/1968 | Stauffer et al. | 342/411 |
| 3,761,819 | 9/1973 | Fukata | 340/825.16 |
| 4,027,289 | 5/1977 | Toman | 340/947 |
| 4,138,678 | 2/1979 | Kirner | 342/173 |
| 4,189,635 | 2/1980 | Sheller | 377/29 |
| 4,333,081 | 6/1982 | Höfgen | 342/408 |
| 4,532,517 | 7/1985 | LaBerge et al. | 342/372 |
| 4,561,095 | 12/1985 | Khan | 371/3 |
| 4,623,892 | 11/1986 | Enein | 364/429 |
| 4,647,926 | 3/1987 | Devensky et al. | 340/947 |
| 4,654,582 | 3/1987 | Ito | 340/963 |
| 4,757,316 | 7/1988 | Brault et al. | 342/408 |

Primary Examiner—Joseph A. Orsino
Assistant Examiner—Brent A. Swarthout
Attorney, Agent, or Firm—E. A. Onders

[57] ABSTRACT

The fault monitoring function of an executive monitor contained in a microwave landing system is verified by evaluating a history of the parametric information sampled by an executive monitor and storing in memory the number of out of tolerance parametric signals received from an antenna means over a predetermined time period, replacing the stored number of out-of-tolerance parametric signals with a predetermined number that will be beyond a second predetermined limit if another out-of-tolerance parametric signal is added to said number, adding one such internally generated out-of-tolerance parametric signal to said predetermined number, generating an alarm if said sum is beyond the second predetermined limit, and restoring the previously stored number of out-of-tolerance parametric signals received from the antenna means if the alarm was generated, and shutting the system down if an alarm was not generated.

5 Claims, 2 Drawing Sheets

AUTOMATIC, REAL-TIME FAULT MONITOR VERIFYING NETWORK IN A MICROWAVE LANDING SYSTEM

BACKGROUND OF THE INVENTION

1. Field of the Invention

The present field of the invention relates to a process and network in which an executive monitor is connected within a microwave landing system ("MLS") to evaluate whether or not an internally-generated out-of-tolerance signal activates an alarm system. If the alarm system is activated, then the proper fault monitoring function of the executive monitor is verified.

2. Description of the Prior Art

An instrument landing system ("ILS") has served as the prior art approach and landing aid for aircraft for many years. The ILS, however, has a number of basic limitations, such as being site critical and expensive to install, being sensitive to extraneous reflections, having a limited number of channels, lacking the flexibility required for aircraft operations, and producing erroneous information in rough terrain and mountainous regions. As a result of these limitations, an MLS has been proposed as a standard ILS replacement for world-wide implementation since it can reduce or eliminate these basic limitations.

The MLS consists of various antenna stations adjacent to a runway which transmit wave energy information to approaching aircraft enabling said aircraft to calculate the following data to safely land on an airport runway: azimuth from an AZ station, elevation from an EL station, range from a precision distance measuring equipment (DME/P) station, and back azimuth from a BAZ station. The AZ station provides an aircraft with heading or approach guidance to runways or helo pads at an airport. The EL station provides for a wide selection of glide slope angles needed by a pilot to land his plane safely on a runway. The DME/P station provides for continuous range information needed by a pilot to ascertain the distance between his aircraft and the airport runway on which he is landing. The BAZ station is similar to the AZ station and is intended to supply guidance to a pilot for missed approaches to and departures from an airport.

More specifically, the AZ station includes an antenna which generates a narrow, vertical, fan-shaped beam which sweeps to and fro across the area to be covered by the AZ station. Before the start of a scan a test pulse is transmitted, then the "to" scan starts. At the end of the scan, there is a pause before the "fro" scan starts. A second test pulse marks the end of the scanning cycle. The aircraft receives a "to" pulse and a "fro" pulse. The time difference between pulses is then measured by the aircraft and gives the angular location of the aircraft relative to the AZ station. The EL station also includes an antenna which generates a narrow horizontal fan-shaped beam which sweeps up and down through the area to be covered at the airport. The time difference between receipt of the up and down pulses is used by the aircraft to determine the elevation angle of the aircraft relative to the EL station and thus its displacement from the glide path angle selected by the pilot to land his aircraft on a runway. The elevation scan cycle requires much less time than the azimuth scan cycle. The elevation scan cycle is normally repeated 39 times per second as compared with 13 times per second for the azimuth cycle. The BAZ station includes an antenna which generates a narrow, fan-shaped, vertical beam which sweeps to and fro horizontally through the area to be covered at the airport. The same angular measurement principle used for determining the approach AZ angle is used for determining the BAZ angle. The DME/P station includes an antenna which transmits wave energy travelling at a known rate. By calculating the time the wave energy travels from the antenna to the aircraft and knowing the rate at which the wave energy travels, the distance or range between aircraft and the airport station can be calculated. The above information is calculated by the approaching aircraft as a direct result of the meaningful information transmitted by the antenna stations included within a given MLS at an airport.

The MLS is capable of operating on any one of 200 channels in the microwave frequency band. The present microwave frequencies in use are between 5043 and 5090.7 megahertz. The AZ, BAZ and EL stations all transmit on the microwave frequency. The DME/P station transmits a paired frequency in L-Band. The MLS signal format has the potential to transmit signals from the above-mentioned various stations in any desired order to approaching aircraft. A preamble or data word is transmitted by each station to approaching aircraft prior to the main wave energy being transmitted in order to inform the approaching aircraft of which function (AZ, EL, BAZ, DME/P) will be transmitted next. As soon as the aircraft decodes the message it waits for the wave energy to be received in order to perform the desired calculation. Then, the aircraft awaits the next preamble to ascertain the identity of the next transmitted function. As can readily been seen, the MLS has numerous advantages over the ILS.

All MLS installations transmit the following basic data to approaching aircraft: facility (landing runway) identification; azimuth threshold distance, coverage and off-set (distance from AZ antenna to fixed spot on center line of runway); beam widths (AZ, EL); DME/P distance, off-set and channel (distance between station and runway); and elevation height, off-set and distance from threshold. Most of this information is needed by the equipment aboard the approaching aircraft to make the necessary computations for an approach to the airport. Any malfunction in the MLS equipment will cause the approaching aircraft to make faulty calculations and rely upon erroneous data. For this reason, it is absolutely essential to continuously maintain the MLS system and to verify that the MLS system stations are transmitting accurate information.

The MLS was the first system designed to utilize a maintenance program. The advantages of such a maintenance program include a reduction in the time spent in travel maintaining the system and a reduction in the maintenance and record-keeping for the system, which in turn allows more effective use of a smaller number of maintenance personnel operating from a smaller number of maintenance bases. Overall, such a maintenance program is economical, reliable, and efficient.

Each MLS station is supported by an executive monitor and a maintenance field monitor, both of which are tools implementing the maintenance program. The executive monitor samples the information being transmitted by each antenna station to approaching aircraft. In other words, the executive monitor evaluates the same information that the antenna is transmitting to approaching aircraft to ensure that the information being sent to the aircraft is reliable. For example, the executive monitor checks the accuracy of the angle code throughout the antenna coverage and thus can detect when a given sample of the angle code is beyond a predetermined limit. Examples of such transmitted parameters which are checked by the executive monitor to ascertain whether or not they are out-of-tolerance are (a) scanning beam mean angle error, (b) function preamble, (c) effective radiated power (whether it be for the function preamble, the EL and BAZ scanning beams, clearance pulses, or an out of coverage indicator), (d) timing error in signal format, (e) synchronization error in time division multiplexing, (f) digital phase shift keying ("DPSK") data transmission, (g) interstation synchronization, (h) array integrity parameters (such as dynamic sidelodes, channel failures, frequency channels, etc.), and (i) clearance angle. If any of these transmitted parameters a–j are out-of-tolerance, then the executive monitor automatically initiates an alarm, the station is shut down, and the approaching aircraft does not receive information from that station. The AZ, EL, BAZ, and DME/P antenna stations each contain an executive monitor. If the EL or BAZ station is shut down, the other stations are still operable and transmit information to the approaching aircraft. If the AZ station is shut down, however, all stations are disabled and do not transmit information to approaching aircraft. Since the executive monitor initiates an alarm and shuts down a station or the system when an out-of-tolerance parameter is detected over a predetermined period of time, it is necessary to verify that the fault monitoring function of the executive monitor is operating properly and will provide such an alarm when such an out-of-tolerance parameter is detected over that predetermined period of time. Otherwise, an approaching aircraft may be erroneously relying on MLS supplied information which should have generated an alarm and shut down the station or the MLS without transmitting information to approaching aircraft.

SUMMARY OF THE INVENTION

An object of the invention is automatic real-time verification of the fault monitoring operation of an executive monitor so that an alarm is generated and declared valid when an internally generated out-of-tolerance or erroneous signal is detected by the monitor.

A further object of the invention is to provide for the verification of the fault monitoring operation of an executive monitor in which a station control board is connected on line with the executive monitor and provides a signal thereto representative of erroneous or out-of-tolerance data in order to initiate an alarm in the executive monitor. Another object of the invention is to store the actual data obtained by the executive monitor until proper fault monitoring verification occurs.

Another object of the invention is to employ a filter counting means to record a history of the out-of-tolerance data received by the executive monitor so that the filter counting means can be preconditioned during the verification process to receive one additional out-of-tolerance of tolerance sample to thereby generate an alarm within the executive monitor.

Another object of the invention is to employ a switch which will permit an internally generated out-of-tolerance sample to be analyzed instead of the sampled information generated by the antenna system.

For a better understanding of the present invention together with other and further objects, reference is made to the following description in conjunction with the accompanying drawings.

DETAILED DESCRIPTION OF THE INVENTION

Figure 1:
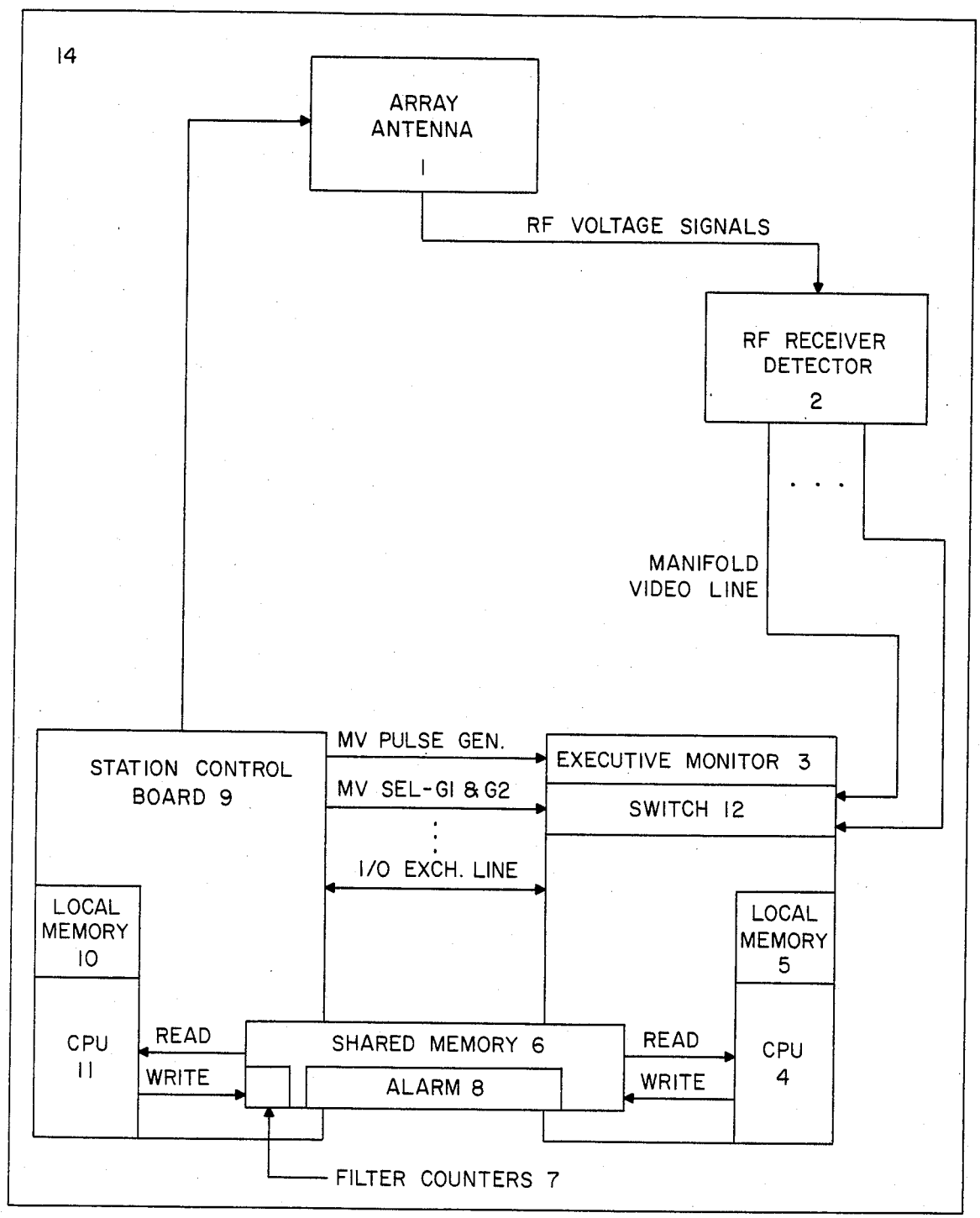
FIG. 1 is a schematic block diagram of a circuit for verifying proper operation of the fault monitoring function of the executive monitor according to the invention.

FIG. 1 illustrates the EL station 14 components of an MLS system which are used to process one of many MLS parameters transmitted to approaching aircraft and to verify the proper functioning of a fault monitor system within the MLS should an out-of-tolerance parameter be detected by the MLS system.

Since many parameters are verified in an MLS (see parameters a–j listed above), the one chosen to best illustrate the invention and the one shown in FIG. 1 is the scanning beam mean angle error parameter. Although the scanning beam mean angle error parameter is illustrated, it is to be understood that any of the other parameters verified by the landing system could have been chosen to illustrate the invention, and in this regard, the invention is not to be limited to the illustrated parameter. The scanning beam mean angle error from an EL station provides the difference between the actual height of the approaching aircraft in angular degrees and the height the approaching aircraft already calculated. The EL station transmits scanning beam mean angle error information to approaching aircraft by an array antenna means 1. The antenna means 1 also samples this transmission internally within the MLS system by providing an output of high frequency RF voltage signals to an RF receiver detector means 2. The detector means 2 in conventional fashion converts the voltage signals into a series of D-C video pulses and outputs them to an executive monitor means 3 over a manifold video line. The executive monitor means 3 contains a local CPU 4, local memory means 5, and a memory means 6 shared with a control means 9, called a station control board.

The shared memory means 6 contains two filter counters 7. Like the executive monitor means 3, the control means 9 also contains a local CPU 11 and memory means 10. CPUs 4 and 11 are thus able to read from or write into the shared memory means 6. CPUs 4 and 11 perform comparisons and calculations. The two filter counters 7 are used in the executive monitor means 3 (together with an angle decoder not shown) to detect the time of occurrence of the rising and falling edges of the video pulses and thus an out-of-tolerance scanning beam angle. If a small scanning beam angle error is detected, one of the two filter counters 7 increments. If a large scanning beam angle error is detected the other filter counter 7 increments. If the calculated scanning beam angle is within a first predetermined limit, then the filter counters 7 decrement, but never below a value of zero. The approaching aircraft detects the same timing information as the executive monitor means 3. The pulse edge are defined as the 3 dB of each pulse and are detected when the video pulse amplitude equals a first reference voltage corresponding to 0.707 times a second reference voltage which is stored in the executive monitor's local memory means 5 in digital form. The comparison of the video pulses with said second reference voltage eliminates the counting of spurious false alarm signals and thus the erroneous calculation of guidance information.

As another safeguard, at least two rising and two falling edges (two pulses) are analyzed in real-time by the CPU 4 in the executive monitor to determine the scanning beam angle error. Thirty-one samples of these paired video pulses must be fed to the two filter counters over a 0.8 second time period in order for the executive monitor to accurately and reliably determine if an out of tolerance scanning beam mean angle error exists. Such determination is made by comparing the number of incremented counts in each filter counter with a second predetermined limit for each stored in memory. If the number of incremented counts exceeds the second predetermined limit for either filter counter, then the filter counter output indicates that mean erroneous guidance—the scanning beam mean angle error is beyond acceptable limits—exists for the prescribed 0.8 second time period; an alarm 8 is, therefore, generated in the executive monitor and noted in the memory means 6 shared by the monitor means 3 and the control means (station control board) 9 when such erroneous guidance is detected. Under these conditions, an alarm signal is then fed by the station control board 9, to the transmitter of the array antenna means 1 shutting the system down. Of course, if erroneous guidance is not indicated by either filter counter, then the alarm system will not be activated and the system will not be shut down. The approaching aircraft realizes that a fault condition has been detected in a particular station when it does not receive any information from that station.

Figure 2:
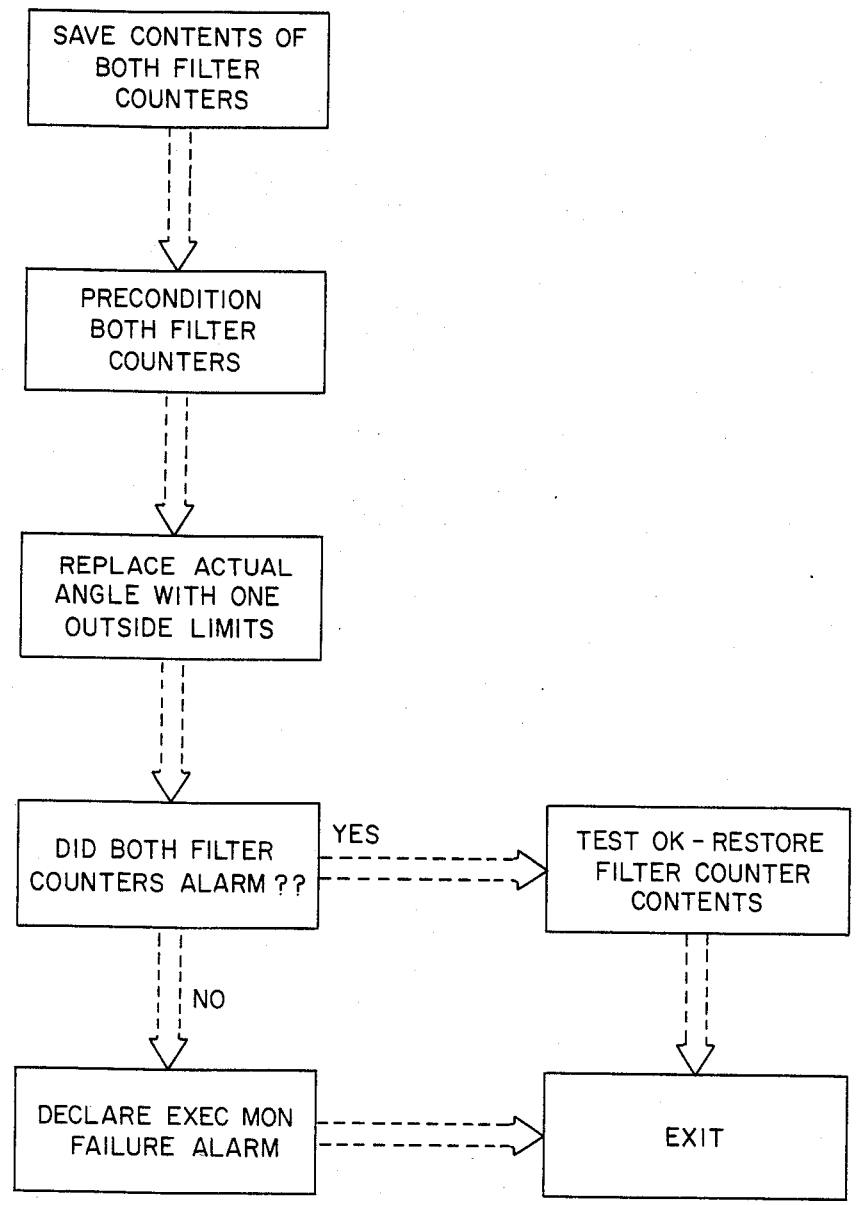
FIG. 2 is a flow-chart illustrating a sequence of operations for verifying proper operation of the fault monitoring function of the executive monitor.

The real-time, automatic operation of the present fault monitoring verification scheme will now be explained with reference to FIG. 2. FIG. 2 shows through logic the manner in which the proper operation of the fault monitoring function performed by the executive monitor is verified. Using the scanning beam mean angle error parameter by way of example only, verification is accomplished by having the contents of the two filter counters 7 saved in the shared memory means 6 in a location separate and apart from the filter counters 7. Between antenna scans the two filter counters 7 are then provided with a predetermined count that will cause the generation of a real-time, automatic alarm if one more sample outside scanning beam mean angle error limits is received. This preconditioning of the two filter counters is accomplished in the memory means 6 shared by the control means (station control board) 9 and executive monitor means 3 shown in FIG. 1. During the next antenna scan, the control means CPU 11 sends a signal over the MV SEL-G1 and G2 line activating switch 12 which replaces the parametric video output received by the executive monitor means 3 with one out-of-tolerance pulse pair sample generated internally. The internally generated out-of-tolerance pulse pair sample is sent by CPU 11 over the MV pulse generator line to the executive monitor which then increments the filter counters 7. The internally generated pulse pair represents a sample outside filter counter limits and when summed with the predetermined count in filter counters 7 should activate alarm 8.

If an alarm is generated as a result of the introduction of the internally-generated out-of-tolerance pulse pair to the filter counters 7, then the test is determined to be valid, i.e. the fault monitoring function of the executive monitor is working properly. Under these conditions, the previously saved contents of both filter counters are restored in order for normal operation of the system to be resumed on the next antenna scan. If either filter counter does not generate an alarm, then an executive monitor failure is declared in the station control board 9, and the actual, real-time alarm is activated. Under these circumstances the station or system is automatically shut down by the station control board 9 and in need of repair. This informs maintenance personnel that the system is not properly monitoring fault conditions when scanning beam mean angle errors in excess of a second predetermined limit are detected. The above real-time verification process is automatic, software controlled, and conducted every 15 minutes in an MLS. The MLS system also can request the performance of a verification test from human sources.

Specific structural details for the shared memory means 6 and local memories 5 and 10 would be apparent to one skilled in the art. Although the alarm 8, and filter counters 7 are shown in FIG. 1 to be contained in the shared memory means 6, those functions could be performed by separate hardware or in local memories 5 and 10 with assistance from processors 4 and 11. An arithmetic logic unit could be used in combination with the memories and processors to perform calculations, with intermediate and final results stored in memories 5, 6, or 10. The verification process, although described in reference to an MLS, may be used with any type of landing system. All of the above changes could be made without departing from the true scope of the invention.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed:

1. Apparatus for automatically verifying in real-time the proper operation of a fault monitor in an aircraft landing system, comprising:
   antenna means for periodically transmitting aircraft guidance signals intended to have a predetermined characteristic during said transmission periods;
   monitor means for receiving said transmitted signals and determining whether said characteristic exceeds a predetermined limit;
   control means connected to the monitor means for replacing said received signals with a supplied signal having said characteristic and wherein said characteristic exceeds said predetermined limit;
   memory means for storing a first number representing the number of times said characteristic of said transmitted signal exceeds said predetermined limit in a selected time period;
   alarm means associated with said monitor means and said memory means for generating an alarm when said stored number represents a predetermined number;
   preconditioning means for replacing said stored first number with a second number between selected transmission periods of said antenna means, said second number being one less than said predetermined number; and
   means for causing said control means to supply said supplied signal during the next transmission period following the replacement of said stored first number with said second number by said preconditioning means, thereby causing said stored number to become equal to said predetermined number, as a result of which said alarm means should generate an alarm.

2. The apparatus as claimed in claim 1 wherein the alarm means generates an alarm and causes the antenna means to terminate transmission when said stored number represents said predetermined number and an alarm was not generated as a result thereof.

3. The apparatus as claimed in claim 1 wherein the memory means is read into and written from both the monitor means and control means.

4. The apparatus as claimed in claim 1 wherein said memory means restores said stored first number after said alarm has been generated and causes said control means to discontinue replacing said received signals with said supplied signal, thereby causing said monitor means to resume normal monitoring of said received signals.

5. A method of automatically verifying in real-time the proper operation of a fault monitor in an aircraft landing system, comprising:

receiving and evaluating signals periodically transmitted by said landing system and intended to have a predetermined characteristic during said transmission periods, and storing in memory a first number representing the number of items said characteristic of said received signals exceeds a predetermined limit within a predetermined time period;

replacing said stored first number in memory with a second number between selected transmission periods of said landing system, said second number being one less than a predetermining number;

replacing said received signals with a supplied signal during the next transmission period following the replacement of said stored first number in memory by said second number, said supplied signal having said characteristic and wherein said characteristic excess said first predetermined limit;

generating an alarm when said stored number represents a number equal to said predetermined number;

restoring said stored first number if said alarm was generated; and generating an alarm and rendering the system inoperative if an alarm was not generated when the number represented by said stored number exceeds said predetermined number.

* * * * *